(12) United States Patent  
Yasui

(10) Patent No.: US 12,109,595 B2  
(45) Date of Patent: Oct. 8, 2024

(54) POWDER PARTICLE FOR SHAPED METAL OBJECT

(71) Applicant: NABTESCO CORPORATION, Tokyo (JP)

(72) Inventor: Tsutomu Yasui, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 94 days.

(21) Appl. No.: 17/015,934

(22) Filed: Sep. 9, 2020

(65) Prior Publication Data

US 2021/0078074 A1  Mar. 18, 2021

(30) Foreign Application Priority Data

Sep. 18, 2019  (JP) .................................. 2019-169741

(51) Int. Cl.
*B07C 5/342* (2006.01)
*B07C 5/36* (2006.01)
(Continued)

(52) U.S. Cl.
CPC ............ *B07C 5/3425* (2013.01); *B22F 1/065* (2022.01); *B22F 1/102* (2022.01); *B22F 1/142* (2022.01);
(Continued)

(58) Field of Classification Search
CPC .. B22F 1/16; B22F 1/102; B22F 10/00; B22F 1/065; B22F 1/142; B22F 2999/00; B22F 10/28; B22F 10/34; B22F 10/39; B22F 10/73; B07C 5/3425; B07C 5/36; B33Y 10/00; B33Y 40/10; B33Y 70/00; B33Y 80/00; B33Y 50/02; B33Y 40/00;
(Continued)

(56) References Cited

U.S. PATENT DOCUMENTS

2010/0140550 A1  6/2010  Keller et al.
2016/0193696 A1*  7/2016  Mcfarland ........... B23K 26/342
                                                  219/76.12
(Continued)

FOREIGN PATENT DOCUMENTS

CN    109746435 A    5/2019
EP    3260223 A1    12/2017
(Continued)

OTHER PUBLICATIONS

Extended European Search Report dated Dec. 7, 2020 issued in corresponding European Application No. 20196351.9 (13 pgs.).
(Continued)

*Primary Examiner* — Rebecca Janssen
(74) *Attorney, Agent, or Firm* — Pillsbury Winthrop Shaw Pittman LLP

(57) ABSTRACT

Provided are powder particles used for fabrication of a shaped metal object for which determination of an impurity therein can be easily performed, a manufacturing method thereof, a sorting device and sorting method thereof, a powder purity determination device and method, a powder
(Continued)

storage method, a powder storage container, a method of manufacturing a shaped metal object, and a shaped metal object manufacturing apparatus. The powder particle for a shaped metal object includes a powder body made of metal, and an identification portion provided on or in the powder body.

1 Claim, 16 Drawing Sheets

(51) Int. Cl.
| | |
|---|---|
| B22F 1/065 | (2022.01) |
| B22F 1/102 | (2022.01) |
| B22F 1/142 | (2022.01) |
| B22F 1/16 | (2022.01) |
| B22F 10/00 | (2021.01) |
| B33Y 10/00 | (2015.01) |
| B33Y 40/10 | (2020.01) |
| B33Y 70/10 | (2020.01) |
| B33Y 70/00 | (2020.01) |
| B33Y 80/00 | (2015.01) |

(52) U.S. Cl.
CPC ............... *B22F 1/16* (2022.01); *B22F 10/00* (2021.01); *B33Y 70/10* (2020.01); *B07C 5/36* (2013.01); *B33Y 10/00* (2014.12); *B33Y 40/10* (2020.01); *B33Y 70/00* (2014.12); *B33Y 80/00* (2014.12)

(58) Field of Classification Search
CPC . B33Y 70/10; Y02P 10/25; G01N 2015/1081; G01N 2015/149; G01N 15/1031; G01N 15/1459; G01N 15/147; C22C 2202/02
See application file for complete search history.

(56) References Cited

U.S. PATENT DOCUMENTS

| | | | |
|---|---|---|---|
| 2017/0043395 A1* | 2/2017 | She | B33Y 70/00 |
| 2017/0120528 A1* | 5/2017 | Tejada Palacios | B33Y 30/00 |
| 2018/0147627 A1 | 5/2018 | Nakamura et al. | |
| 2018/0193916 A1 | 7/2018 | Lou et al. | |
| 2018/0339335 A1 | 11/2018 | Aixala et al. | |
| 2019/0247919 A1 | 8/2019 | Kim et al. | |
| 2019/0275587 A1 | 9/2019 | Matsuoka et al. | |
| 2021/0162509 A1 | 6/2021 | Ferrar et al. | |

FOREIGN PATENT DOCUMENTS

| | | |
|---|---|---|
| EP | 3315245 A1 | 5/2018 |
| JP | 2005-335199 A | 12/2005 |
| JP | 2008-214370 A | 9/2008 |
| JP | 2019-084693 A | 6/2019 |
| WO | 2015/025171 A2 | 2/2015 |
| WO | 2015/106113 A1 | 7/2015 |
| WO | 2015/185155 A1 | 12/2015 |
| WO | 2019/097222 A1 | 5/2019 |

OTHER PUBLICATIONS

Notice of Reasons for Refusal dated Jul. 11, 2023, issued in corresponding Japanese Patent Application No. 2019-169741 with English translation (6 pgs.).

* cited by examiner

POWDER PARTICLE FOR SHAPED METAL OBJECT

CROSS-REFERENCE TO RELATED APPLICATIONS

This application is based on and claims the benefit of priority from Japanese Patent Application Serial No. 2019-169741 (filed on Sep. 18, 2019), the contents of which are hereby incorporated by reference in its entirety.

TECHNICAL FIELD

The present invention relates to a powder particle used to fabricate a shaped metal object, a manufacturing method thereof, a sorting device and sorting method thereof, a powder purity determination device and method, a powder storage method, a powder storage container, a method of manufacturing a shaped metal object, and a shaped metal object manufacturing apparatus.

BACKGROUND

In fabrication of a shaped metal object, a technique described in Japanese Patent Application Publication No. 2005-335199 is known. In this technique, a shaped metal object is formed by irradiating a powder with a laser. The powder is designed for fabrication of a shaped metal object.

SUMMARY

For quality control, it is desirable to know the level of impurities mixed in the powder used for fabrication of a shaped metal object. One object of the invention is to provide a powder for fabrication of a shaped metal object for which determination of an impurity therein can be easily performed, a manufacturing method thereof, a sorting device and sorting method thereof, a powder purity determination device and method, a powder storage method, a powder storage container, a method of manufacturing a shaped metal object, and a shaped metal object manufacturing apparatus.

(1) A powder particle used for fabrication of a shaped metal object that can overcome the above-mentioned drawback includes a powder body made of metal, and an identification portion provided on or in the powder body. In this configuration, the powder particle includes the identification portion that is a separate element from the powder body so that the identification portion can be used to recognize an impurity in the powder including the powder particles. That is, the powder is designed for easy recognition of impurities.

(2) In the above powder particle, the identification portion may be provided on the surface of the powder body. In this configuration, the identification portion can be detected based on the appearance of the powder particle. Therefore, the identification portion can be detected more easily than the case where the identification portion is embedded inside the powder body.

(3) In the above powder particle, the identification portion may have a color different from the color of the powder body. In this configuration, it is easy to distinguish between the one with a decreased or modified identification portion and the one with the original identification portion.

(4) In the above powder particle, the identification portion may be formed of a colored polymer. In this configuration, the polymer colored in advance is used so that the manufacturing process can be simplified as compared with the case where the identification portion is first formed of a transparent polymer and then colored.

(5) In the above powder particle, the identification portion may be decreased or modified at a sintering temperature at which the powder particle is sintered. In this configuration, when the powder particle is sintered, the identification portion of the powder particle is decreased or modified. Therefore, it is possible to easily distinguish debris formed during the sintering of powder particles from the powder particles to which heat of the sintering has not applied.

(6) A method of manufacturing powder particles used for fabrication of a shaped metal object that can overcome the above drawback includes a powder body fabrication step in which the powder body is fabricated of metal, and a coating step in which the powder body is coated with a material forming the identification portion. In this configuration, the identification portion can be easily formed.

(7) A sorting device for powder particles used for fabrication of a shaped metal object that overcomes the above drawback includes a sensor unit identifying an identification portion provided on or in a powder body of a powder particle, and a sorting unit sorting the powder particle based on a result of identification performed by the sensor unit. According to this configuration, the sorting unit sorts the powder particle based on the result of identification performed by the sensor unit, so that the powder particles can be accurately sorted for reuse of the powder.

(8) A sorting method for powder particles used for fabrication of a shaped metal object that overcomes the above drawback includes an identifying step in which identification of an identification portion provided on or in a powder body of a powder particle is performed, and a sorting step in which a powder particle is sorted based on the result of identification performed in the identifying step. According to this configuration, the sorting unit sorts the powder particle based on the result of identification performed by the sensor unit, so that the powder particles can be accurately sorted for reuse of the powder.

(9) A purity determination device for powder that overcomes the above drawback includes a sensor unit identifying an identification portion provided on or in a powder body of a powder particle for a shaped metal object, and a purity determination unit determining a purity of the powder including the powder particle based on a result of identification performed by the sensor unit. According to this configuration, the purity determination unit determines the purity of the powder including the powder particles based on identification results of the sensor unit, so that the accuracy of the purity determination can be improved.

(10) A method of determining a purity for powder that can overcome the above drawback includes a step of identifying an identification portion provided on or in a powder body of a powder particle for a shaped metal object, and a step of determining a purity of the powder including the powder particle based on a result of identification performed in the identifying. According to this configuration, the purity of the powder including the powder particles is determined based on identification results obtained in the identifying step, so that the accuracy of the purity determination can be improved.

(11) In a method of manufacturing a shaped metal object that can overcome the above drawback, when one batch of powder including a plurality of powder particles for a shaped metal object is switched to another batch of the powder, powder particles of the powder in a batch that is used after a previous batch have identification portions distinguishable from identification portions of powder particles of the powder in the previous batch. In this way, batches of the powder used as the material for the shaped metal object can be accurately managed.

(12) In a method of storing powder that can overcome the above drawback, powder including powder particles used for fabrication of a shaped metal object is stored in a movement restricted state where the powder particles are prevented from moving. The powder particles move in a storage container and the powder particles rub against each other when the powder is conveyed. So, there is a risk that the identification portions of the powder particles come off. In this respect, according to the above configuration, the movement of the powder particles is suppressed so that friction between the powder particles is reduced, and the identification portions of the powder particles are less likely to come off. This makes it possible to provide the powder with less flaking of the identification portions.

(13) In a storage container that can overcome the above drawback, powder including powder particles used for fabrication of a shaped metal object is stored in a movement restricted state where the powder particles are prevented from moving. This makes it possible to provide the powder with less flaking of the identification portions.

(14) A manufacturing apparatus for a shaped metal object that can overcome the above drawback, includes a feed unit feeding a powder particle for a shaped metal object, the powder particle having a powder body made of metal and an identification portion provided on or in the powder body; a shaped metal object fabrication unit in which a shaped metal object is fabricated by sintering, with a beam, a prescribed portion of powder including the powder particle fed from the feed unit; and a sensor unit detecting an identification portion of the powder particle at least before, during or after fabrication of the shaped metal object. With this configuration, when manufacturing the shaped metal object, it is possible to manage the level of impurities mixed in the powder based on the information regarding the identification portions detected by the sensor unit.

(15) A manufacturing apparatus for a shaped metal object that can overcome the above drawback, includes a feed unit feeding a powder particle for a shaped metal object, the powder particle having a powder body made of metal and an identification portion provided on or in the powder body; a shaped metal object fabrication unit in which a shaped metal object is fabricated by sintering, with a beam, a prescribed portion of powder including the powder particle fed from the feed unit; and a flow unit in which a remover flows to remove the identification portion of the powder particle. In this configuration, the identification portions are removed by the remover during the fabrication process of the shaped metal object, and the powder particles on which the identification portions have been removed form the shaped metal object. As a result, it is possible to form the shaped metal object that contains a relatively small amount of the identification portions.

(16) In the above manufacturing apparatus for a shaped metal object, the identification portion of the powder particle is an oxide film formed by oxidation of a surface of the powder body of the powder particle. The remover is a reducing agent. In the fabrication process of the shaped metal object, the oxide films serving as the identification portions are removed by the reducing agent, and the powder particles on which the oxide films have been removed form the shaped metal object. Consequently, it is possible to form the shaped metal object that contains a relatively small amount of oxide.

DESCRIPTION OF THE EMBODIMENTS

First Embodiment

Figure 1:
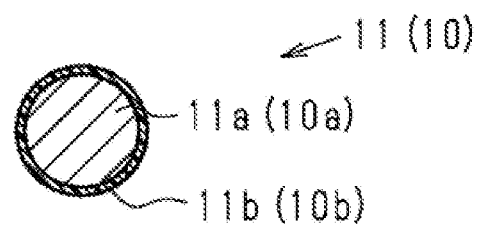
FIG. 1 is a sectional view of a particle of a powder used for fabrication of a shaped metal object according to a first embodiment.

A powder 1 for fabrication of a shaped metal object will be now described.

The powder 1 (see FIG. 17) is used as a material for a shaped metal object 2 fabricated by a powder sintering additive manufacturing method. The powder sintering additive manufacturing method is a method of fabricating the shaped metal object 2 (see FIG. 17) by sequentially sintering laminated layers of the powder 1 from bottom to top.

The powder 1 is a collection of powder particles 10 used for fabrication of a shaped metal object. The powder particle 10 for a shaped metal object includes a powder body 10a made of metal and an identification portion 10b provided on or in the powder body 10a.

The metal forming the powder body 10a is, for example, gold, silver, copper, iron, nickel, cobalt, titanium, aluminum, magnesium, or an alloy thereof.

The powder body 10a is formed by an atomizing method, an ion method in which particles (that is, the powder bodies 10a) are precipitated from a solution, a hydrolysis method of an alkoxide, a physical vapor deposition method (PVD method), a chemical vapor deposition method (CVD method), or the like. The powder body 10a is preferably formed in a sphere or a spherical shape. The average particle size (median diameter, DSO) of the powder body 10a is preferably in a range of 1 to 100 μm (both inclusive).

The identification portion 10b is configured as a portion for identifying the powder particle 10 from other substances. The identification portion 10b allows the powder particle to be distinguished from an impurity in the powder 1. The impurity is, for example, debris 19 (see FIG. 19) formed during sintering. Specifically, the identification portion 10b is configured as a portion that allows to distinguish between a powder particle 10 before heat is applied and a powder particle 10 (specifically debris 19) to which heat has been applied. In another example, the impurity is a foreign substance other than the powder particle 10. In still another example, the impurity is a powder particle 10 in a batch different from the batch of the powder 1.

The identification portion 10b is configured to be detectable by a sensor unit that detects the identification portion 10b (for example, see a sensor unit 22 of the sixth embodiment). In one example, the identification portion 10b has a color. In another example, the identification portion 10b is configured as a groove. In still another example, the identification portion 10b has an odor. In still yet another example, the identification portion 10b has a magnetic property.

The identification portion 10b may be provided on the surface of the powder body 10a. Alternatively or additionally, the identification portion 10b may be provided inside the powder body 10a. The identification portion 10b may be formed of a material different from that of the powder body 10a. Further, the identification portion 10b may be a structure (for example, a groove) formed on the surface of the powder body 10a.

When the identification portion 10b is provided on the surface of the powder body 10a, it is preferable that the identification portion 10b be decreased or modified at a temperature at which the powder particles 10 are sintered. The sintering temperature refers to the temperature at which the powder particles 10 for a shaped metal object are sintered in the powder sintering additive manufacturing method. Specifically, it is preferable that the identification portion 10b be modified or decreased from the powder portion 10a by being evaporated or decomposed during sintering.

One example of the powder particle 10 used for fabrication of a shaped metal object will now be described with reference to FIG. 1. A powder body 11a of a powder particle 11 (10) for a shaped metal object is made of metal. An identification portion 11b is made of resin. The identification portion 11b is decomposed when the powder 1 is sintered. The identification portion 11b has a color different from that of the powder body 11a. For example, when the powder body 11a is gray, the identification portion 11b is formed of a polymer colored in red. The identification portion 11b covers at least a part of the surface of the powder body 11a. Preferably, the identification portion 11b covers the entire powder body 11a. The thickness of the identification portion 11b is preferably 0.1 to 10 μm (both inclusive). This is because when the thickness of the identification portion 11b is less than 0.1 μm, the identification portion 11b may easily come off. Whereas when the thickness of the identification portion 11b is larger than 10 μm, the volume reduction of the powder particle 10 caused by loss of the identification portion 11b burned during sintering becomes large, and dimensions of the shaped metal object 2 formed by the sintering may deviate largely from the designed dimensions of the shaped metal object 2.

For example, the identification portion 11b is formed of a colored polymer. The colored polymer is a polymer that has been colored in advance. The polymer is polyethylene resin, polystyrene resin, polypropylene resin or the like. The colorant used to color the polymer is preferably an organic material because it decomposes during sintering.

A method of manufacturing the powder particle 10 for a shaped metal object includes at least a coating step. The method of manufacturing the powder particle 10 may include a powder body fabrication step. In the powder body fabrication step, the powder body 11a is formed of metal. The method of fabricating the powder body 11a may include an atomizing method, an ion method in which particles (that is, the powder bodies 10a) are precipitated from a solution, a hydrolysis method of an alkoxide, a physical vapor deposition method (PVD method), a chemical vapor deposition method (CVD method), or the like. In the coating step, the powder body 11a is coated with a material forming the identification portion 11b. The coating method is not particularly limited. Examples of the coating method include a dipping method, a spraying method, a transfer method, and the like.

Operation in the embodiment will now be described.

To fabricate the shaped metal object 2 by the powder sintering additive manufacturing method, layers of the powder 1 are sequentially sintered by irradiating each layer with a beam (laser beam or electron beam). In the powder 1, most of portions irradiated with the beam are sintered to form parts of the shaped metal object 2, but some of the irradiated portions are scattered as debris 19 (see FIG. 19). The debris 19 falls around the shaped metal object 2. When the sintering of one layer of the powder 1 is completed, a new layer of the powder 1 is laminated on the shaped metal object 2 in fabrication. Thereafter, beam irradiation and addition of a layer of the powder 1 are repeated. By repeating these steps, the shaped metal object 2 is formed. After the fabrication, the powder particles 10 that have not been used in the sintering and the debris 19 are mixed in the powder 1 around the shaped metal object 2. The powder 1 around the shaped metal object 2 is reused for effective use of resource.

When the powder 1 around the shaped metal object 2 is reused, the debris 19 is considered as an impurity. The debris 19 has a different particle size and shape from the powder particle 10, and the debris 19 may be oxidized. Therefore, the debris 19 is removed from the powder 1 that is to be reused. The debris 19 larger than the powder particle 10 can be easily removed by sieving or sifting, but it is difficult to remove the debris 19 of the same size as or smaller than the powder particle 10.

In the embodiment, the powder particle 10 for a shaped metal object has the identification portion 10b. The identification portion 10b is decomposed by sintering of the powder particle 10 and is decreased or modified. Therefore, in the debris 19, the identification portion 10b is decreased or modified. Therefore, the debris 19 can be easily distinguished from the powder particles 10 by detecting the state of the identification portion 10b.

Specifically, the colored polymer is decomposed by the beam irradiation. Therefore, the identification portion 10b of the debris 19 is decreased or discolored (one type of modification). Therefore, by detecting the color of the surface of the powder particle 10, the debris 19 can be easily distinguished from the powder particles 10.

Advantageous effects of the embodiment will now be described.

(1-1) The powder particle 10 for a shaped metal object includes the powder body 10a made of metal and the identification portion 10b provided on or in the powder body 10a. In this configuration, the powder particle 10 for a metal shaped object includes the identification portion 10b which is an element different from the powder body 10a. The identification portion 10b makes it possible to distinguish impurities such as debris 19 from the powder 1. That is, the powder 1 is designed for easy recognition of impurities.

(1-2) The identification portion 10b is provided on the surface of the powder body 10a. In this configuration, the identification portion 10b can be detected based on the appearance of the powder particle 10. Therefore, the identification portion 10b can be detected more easily than the case where the identification portion 10b is embedded inside the powder body 10a.

(1-3) The identification portion 10b preferably has a color different from that of the powder body 10a. In this configuration, it is easy to distinguish between the one with a decreased or modified identification portion 10b and the one with the original identification portion 10b.

(1-4) The identification portion 10b is preferably formed of a colored polymer. In this configuration, the polymer colored in advance is used so that the manufacturing process can be simplified as compared with the case where the identification portion 10b is first formed of a transparent polymer and then colored.

(1-5) It is preferable that the identification portion 10b be decreased or modified at the sintering temperature at which the powder particles 10 are sintered. In this configuration, when the powder particle 10 is sintered, the identification portion 10b of the powder particle 10 is decreased or modified. Therefore, it is possible to easily distinguish the debris 19 formed during the sintering of the powder particles 10 from the powder particles 10 to which heat of the sintering has not applied.

(1-6) The method of manufacturing the powder particles 10 for a shaped metal object includes the powder body fabrication step in which the powder body 10a is formed of metal, and a coating step in which the metal powder body 10a is coated with a material forming the identification portion 10b. In this configuration, the identification portion 10b can be easily formed.

Second Embodiment

Figure 2:
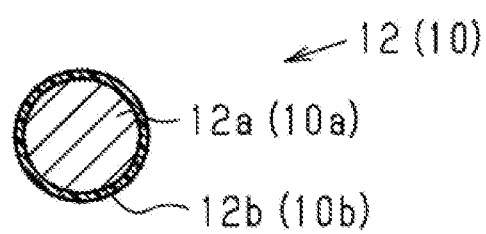
FIG. 2 is a sectional view of a particle of a powder used for fabrication of a shaped metal object according to a second embodiment.

Another example of a powder particle 12 (10) for fabrication of a shaped metal object will now be described with reference to FIG. 2. In a second embodiment, the configuration of an identification portion 12b is different from that of the identification portion 11b in the first embodiment. In the following description of the second embodiment, the same elements as in the first embodiment will be denoted by the same reference numerals and descriptions thereof will be omitted.

The powder 1 includes a plurality of the powder particles 12 for fabrication of a shaped metal object. A powder body 12a of the powder particle 12 for a shaped metal object is made of metal. The identification portion 12b is made of a metal oxide film. The oxide film is decreased or modified by reduction.

When the powder 1 is sintered, it is preferable that the identification portion 12b be decreased or modified. Specifically, when the powder 1 is sintered by beam irradiation, a reducing agent that reduces an oxide film is flowed to reduce the oxide film, thereby decreasing or modifying the identification portion 12b. Hydrogen is an example of the reducing agent. The identification portion 12b preferably has a color different from that of the powder body 12a. The identification portion 12b covers at least a part of the surface of the powder body 12a. Preferably, the identification portion 12b covers the entire powder body 12a. The thickness of the identification portion 12b is preferably 0.1 to 10 μm (both inclusive).

For example, when the powder body 12a is made of titanium, the oxide film is formed of titanium oxide (also called titanium dioxide). Titanium is silver gray. Titanium oxide is white. The method of manufacturing the powder particle 12 for a shaped metal object includes at least a powder body fabrication step in which the powder body 12a is fabricated and an oxide film forming step. When the powder body 12a is titanium, titanium powder is obtained in the powder body fabrication process. Titanium powder is obtained by crushing titanium sponge. The titanium powder may contain several % of hydrogen by mass ratio. The titanium powder may be produced from titanium ore. In this case, the titanium powder can be obtained as follows. Reacts titanium ore (titanium dioxide) with chlorine and carbon to form titanium tetrachloride. The titanium tetrachloride is reduced with magnesium to form titanium sponge (Kroll process). The titanium sponge is then weakened with hydrogen and crushed. The crushed titanium is subsequently dehydrogenated to obtain the titanium powder. The titanium powder may contain several % of hydrogen by mass ratio. In the oxide film forming step, the powder body 12a made of metal is heated in an oxygen atmosphere. In the oxide film forming step, an oxide film that serves as the identification portion 12b is formed.

Operation in the embodiment will now be described.

In this embodiment, the powder particle 12 for a shaped metal object has the identification portion 12b. The identification portion 12b is made of a metal oxide film. It is preferable that, during sintering of the powder particles 12, the oxide film serving as the identification portion 12b is decreased or modified by a reaction with a reducing agent. In this case, the identification portion 12b in the debris 19 is decreased or modified. Therefore, the debris 19 can be easily distinguished from the powder particles 12 by detecting the state of the identification portion 12b.

Specifically, during the beam irradiation of the powder 1, the powder particles 12 are reacted with the reducing agent. Consequently, the oxide film serving as the identification portion 12b is decreased. Therefore, the identification portion 12b of the debris 19 is decreased or discolored (one type of modification). Therefore, by detecting the color of the surface of the powder particle 12, the debris 19 can be easily distinguished from the powder particles 12.

Third Embodiment

Figure 3:
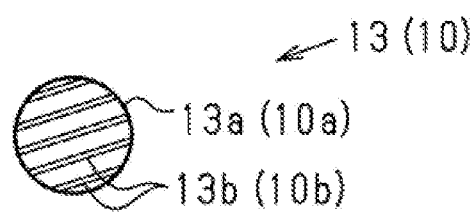
FIG. 3 illustrates a particle of a powder used for fabrication of a shaped metal object according to a third embodiment.

Still another example of a powder particle 13 (10) for fabrication of a shaped metal object will now be described with reference to FIG. 3. In a third embodiment, the configuration of an identification portion 13b is different from that of the identification portion 11b in the first embodiment. In the following description of the third embodiment, the same elements as in the first embodiment will be denoted by the same reference numerals and descriptions thereof will be omitted.

The powder 1 includes a plurality of the powder particles 13 for fabrication of a shaped metal object. A powder body 13a of the powder particle 13 for a shaped metal object is made of metal. The identification portion 13b is formed as a groove (or a scratch) provided on the surface of the powder body 13a. For example, the groove has a V-shaped section. For example, the powder body 13a is placed between two press plates with a plurality of teeth, and a groove is formed on the surface of the powder body 13a by reciprocating one press plate relative to the other press plate in a surface direction (parallel to the pressing surface) while the powder body 13a is sandwiched between the two press plates. The identification portion 13b is formed on at least a part of the surface of the powder body 13a. Preferably, the identification portion 13b is formed on the entire powder body 13a. The identification portion 13b decreases or deforms (kinds of modification) when the powder 1 is sintered. Specifically, once the powder 1 including the powder particles 13 is sintered by beam irradiation, the surface of the powder body is melted and the groove thereon is decreased or deformed.

Operation in the embodiment will now be described.

In this embodiment, the powder particle 13 for a shaped metal object has the identification portion 13b. The identification portion 13b is formed as a groove provided on the surface of the powder body 13a. The groove serving as the identification portion 13b is decreased or modified by heat during sintering of the powder particles 13. Therefore, in the debris 19, the identification portion 13b is decreased or deformed. Therefore, the debris 19 can be easily distinguished from the powder particles 13 by detecting the state of the identification portion 13b.

Fourth Embodiment

Figure 4:
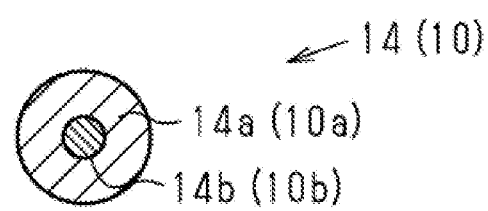
FIG. 4 is a sectional view of a particle of a powder used for fabrication of a shaped metal object according to a fourth embodiment.

Still yet another example of a powder particle 14 (10) for fabrication of a shaped metal object will now be described with reference to FIG. 4. In a fourth embodiment, the configuration of an identification portion 14b is different from that of the identification portion 11b in the first embodiment. In the following description of the fourth embodiment, the same elements as in the first embodiment will be denoted by the same reference numerals and descriptions thereof will be omitted.

The powder 1 includes a plurality of the powder particles 14 for fabrication of a shaped metal object. A powder body 14a of the powder particle 14 for a shaped metal object is made of metal. The identification portion 14b is provided inside the powder body 14a. The identification portion 14b is, for example, a permanent magnet. Examples of the permanent magnet include an alnico magnet, a ferrite magnet, and a neodymium magnet. The powder particle 14 including a permanent magnet is manufactured as follows, for example. In a first step, a core made of the permanent magnet is electrically charged. In a second step, a desired metal is laminated on the charged core by a CVD method. Through above-described process, the powder particles 14 including a permanent magnet can be manufactured.

The permanent magnet serving as the identification portion 14b is demagnetized or degaussed during sintering of the powder 1. Specifically, when the powder 1 is sintered by beam irradiation, the identification portion 14b is demagnetized or degaussed by heat.

Operation in the embodiment will now be described.

In this embodiment, the powder particle 14 for a shaped metal object has the identification portion 14b. The identification portion 14b is provided inside the powder body 14a. The identification portion 14b is made of permanent magnet. The permanent magnet serving as the identification portion 14b is demagnetized or degaussed during sintering of the powder 14. Therefore, in the debris 19, the identification portion 14b is demagnetized or degaussed. Therefore, the debris 19 can be easily distinguished from the powder particles 14 by detecting the state of the identification portion 14b.

Fifth Embodiment

Figure 5:
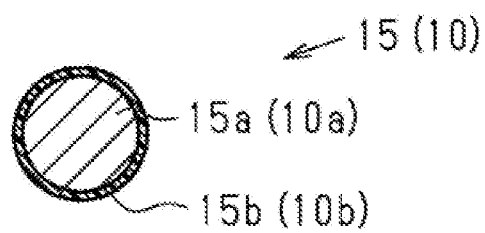
FIG. 5 is a sectional view of a particle of a powder used for fabrication of a shaped metal object according to a fifth embodiment.

Still yet another example of a powder particle 15 (10) for fabrication of a shaped metal object will now be described with reference to FIG. 5.

In a fifth embodiment, the configuration of an identification portion 15b is different from that of the identification portion 11b in the first embodiment. In the following description of the fifth embodiment, the same elements as in the first embodiment will be denoted by the same reference numerals and descriptions thereof will be omitted.

The powder 1 includes a plurality of the powder particles 15 for fabrication of a shaped metal object. A powder body 15a of the powder particle 15 for a shaped metal object is made of metal. The identification portion 15b has a smell. An odorant (hereinafter, "odorous substance") used here is detected by an odor sensor. The identification portion 15b is formed of a resin that releases an odorous substance. The identification portion 15b continuously releases the odorous substance. For example, the identification portion 15b releases the odorous substance for one year or more. As an example, the odorous substance is a substance that can be detected by, for example, a high-sensitivity indium oxide. An example of the odorous substance includes aromatic compounds, alcohols and the like.

Operation in the embodiment will now be described.

In this embodiment, the powder particle 15 for a shaped metal object has the identification portion 15b. The identification portion 15b releases odor. The identification portion 15b that releases an odorous substance decreases during sintering of the powder particles 15 for a shaped metal object. Accordingly, the odorous substance released from the identification portion 15b in the debris 19 is decreased, and thereby it is possible to easily distinguish the debris 19 from the powder particles 15 by detecting the odor.

Sixth Embodiment

Figure 6:
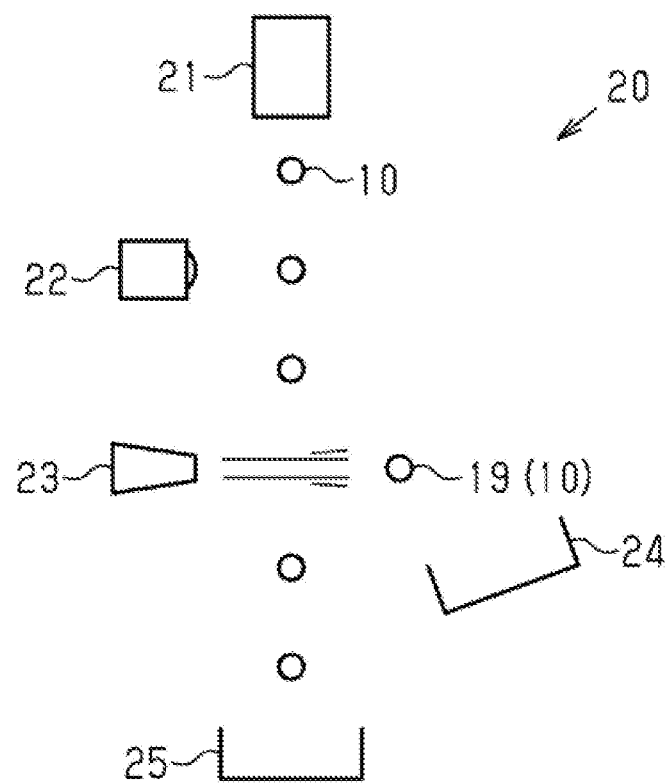
FIG. 6 is a schematic view of a sorting device for powder particles used for fabrication of a shaped metal object according to a sixth embodiment.

A sorting device 20 for the powder particles 10 for a shaped metal object will now be described with reference to FIG. 6.

The sorting device 20 for the powder particles 10 includes a discharge unit 21 that discharges the powder particles 10 one by one, a sensor unit 22 that identifies the identification portion 10b provided on or in the powder body 10a of the powder particle 10, and a sorting unit 23 that sorts the powder particle 10 based on the result of identification performed by the sensor unit 22. Preferably, the sorting device 20 for the powder particles 10 further includes a first storage 24 that stores separated first substances (debris 19) and a second storage 25 that stores separated second substances (powder particles 10 for a shaped metal object).

The discharge unit 21 discharges the powder particles 10 such that the powder particles 10 move along a prescribed trajectory (for example, a trajectory along the vertical direction). The sensor unit 22 identifies the identification portion 10b of the powder particle 10.

When the identification portion 10b is made of a colored polymer or an oxide film and the identification portion 10b has a color, the sensor unit 22 includes a color sensor. The sensor unit 22 detects the color of the powder particle 10 and identifies the identification portion 10b based on the detected color. When the sensor unit 22 determines that the detected color is the same as the original color of the identification portion 10b, it is determined that the identification portion 10b is in an "unchanged state". Whereas when the sensor unit 22 determines that the detected color is different from the original color of the identification portion 10b, it is determined that the identification portion 10b is in a "changed state".

When the identification portion 10b is formed as a groove, the sensor unit 22 includes a camera that captures an image of the surface of the powder particle 10. The sensor unit 22 irradiates the powder particle 10 with light, captures an image of the surface of the powder particle 10, and identifies the state of the groove based on the captured image. When the sensor unit 22 determines that the groove of the captured image has a shape same as the initial shape of the groove of the identification portion 10b, it is determined that the identification portion 10b is in an "unchanged state". Whereas when the sensor unit 22 determines that the groove of the captured image is different from the initial shape of the groove of the identification portion 10b, it is determined that the identification portion 10b is in a "changed state".

When the identification portion 10b is formed of a permanent magnet, the sensor unit 22 includes a magnetic sensor. The sensor unit 22 detects a magnetic field of the powder particle 10 and identifies the identification portion 10b based on the strength of the magnetic field. When the sensor unit 22 determines that the strength of the magnetic field of the powder particle 10 is at the same level as the initial strength of the magnetic field of the identification portion 10b, it is determined that the identification portion 10b is in a "unchanged state". When the sensor unit 22 determines that the strength of the magnetic field of the powder particle 10 is sufficiently smaller than the initial strength of the magnetic field of the identification portion 10b, it is determined that the identification portion 10b is in a "changed state".

When the identification portion 10b has an odor, the sensor unit 22 includes an odor sensor. The sensor unit 22 detects the odor of the powder particle 10 and identifies the identification portion 10b based on the intensity of the odor. When the sensor unit 22 determines that the odor intensity of the powder particle 10 is at the same level as the initial intensity of the odor of the identification portion 10b, it is determined that the identification portion 10b is in an "unchanged state". When the sensor unit 22 determines that the odor intensity of the powder particle 10 is sufficiently smaller than the original odor intensity of the identification portion 10b, it is determined that the identification portion 10b is in a "changed state".

The sorting unit 23 sorts the powder particle 10 based on the results of identification performed by the sensor unit 22. Specifically, when the identification result for the powder particle 10 shows the "changed state," the sorting unit 23 separates the powder particle 10 as debris 19 from other powder particles 10. The powder particle 10 determined to be in the "changed state" is housed in the first storage 24. The powder particle 10 determined to be in the "unchanged state" is housed in the second storage 25. In this embodiment, the sorting unit 23 blows air on the powder particle 10 with the identification result of the "changed state." The sorting unit 23 changes the trajectory of the powder particle 10 by blowing and guides the powder particle 10 to the first storage 24.

Operation in the embodiment will now be described.

The fabrication of the shaped metal object 2 is completed with the powder sintering additive manufacturing method. At this time, the shaped metal object 2 is embedded in the powder 1. The powder 1 (hereinafter, referred to as "used powder 1") around the shaped metal object 2 is reused. In the used powder 1, the powder particles 10 and the debris 19, which were not used for fabrication of the shaped metal object 2, are mixed. Before reusing the used powder 1, the debris 19 is removed from the used powder 1.

Removal of the debris 19 is preferably performed in two steps. In the first step, the debris 19 is removed depending on the size. Specifically, the used powder 1 is sieved. In the second step, the debris 19 is removed by the sorting device 20 for the powder particles 10. In this embodiment, the sorting unit 23 removes the debris 19 by blowing air onto the powder particle 10 with the identification result of "there is a change in the identification portion 10b".

Advantageous effects of the embodiment will now be described.

The sorting device 20 for the powder particles 10 includes the sensor unit 22 that identifies the identification portion 10b, and the sorting unit 23 that sorts the powder particle 10 based on the result of identification performed by the sensor unit 22. According to this configuration, the sorting unit 23 sorts the powder particle 10 based on the result of the identification performed by the sensor unit 22, so that the powder particles 10 can be accurately sorted for reuse of the powder 1.

Seventh Embodiment

Figure 7:
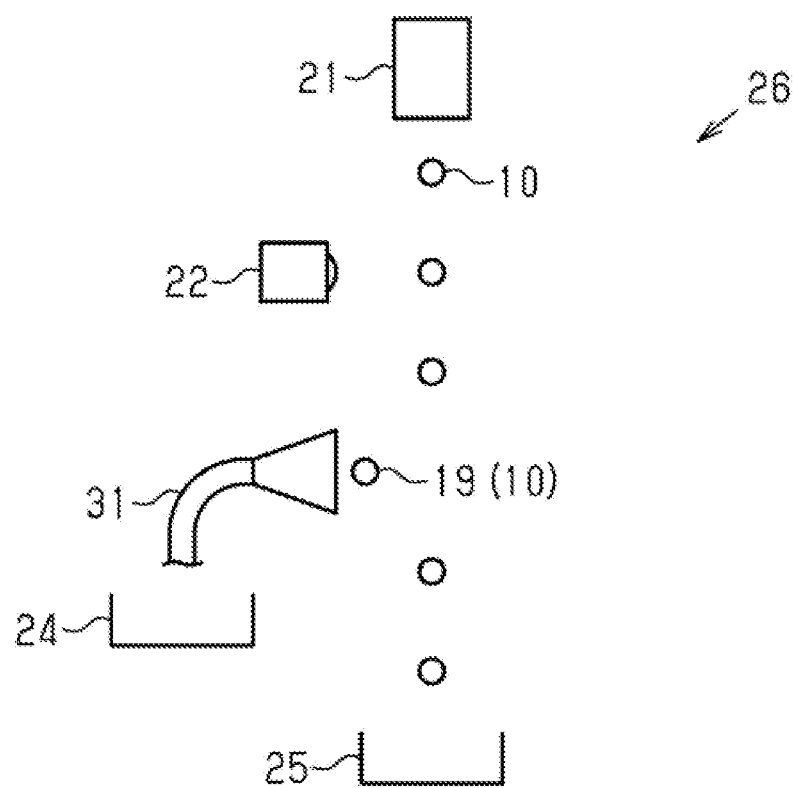
FIG. 7 is a schematic view of a sorting device for powder particles used for fabrication of a shaped metal object according to a seventh embodiment.

A sorting device 26 for the powder particles 10 for a shaped metal object will now be described with reference to FIG. 7.

In a seventh embodiment, the configuration of a sorting unit 31 is different from that of the sorting unit 23 in the sixth embodiment. In the following description of the seventh embodiment, the same elements as in the sixth embodiment will be denoted by the same reference numerals and descriptions thereof will be omitted.

In the seventh embodiment, the sorting unit 31 sorts the powder particle 10 based on the result of identification performed by the sensor unit 22. The sorting unit 31 suctions the powder particle 10 with the identification result of "there is a change in the identification portion 10b" together with the air. By such suction, the sorting unit 31 guides the powder particle 10 determined as "there is a change in the identification portion 10b" to the first storage 24. As described above, since the powder particle 10 determined as "there is a change in the identification portion 10b" is guided to the first storage 24 by suction, the powder particles 10 (debris 19) with "there is a change in the identification portion 10b" are securely guided to the first storage 24.

Since the sorting device 26 according to the seventh embodiment includes the sorting unit 31 that sorts the powder particle 10 based on the identification result performed by the sensor unit 22, the same advantageous effects as the sorting device 20 according to the sixth embodiment can be obtained.

Eighth Embodiment

Figure 8:
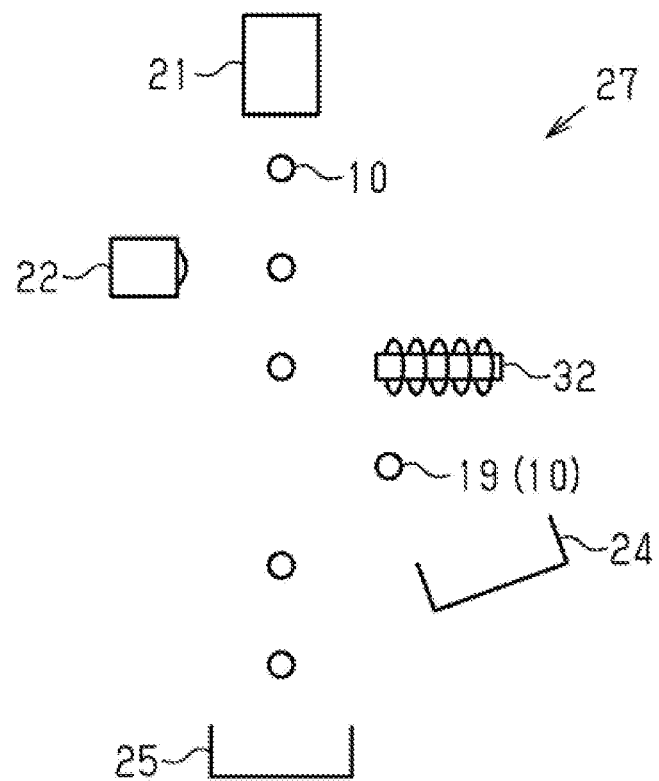
FIG. 8 is a schematic view of a sorting device for powder particles used for fabrication of a shaped metal object according to an eighth embodiment.

A sorting device 27 for the powder particles 10 for a shaped metal object will now be described with reference to FIG. 8.

In an eighth embodiment, the configuration of a sorting unit 32 is different from that of the sorting unit 23 in the sixth embodiment. In the following description of the eighth embodiment, the same elements as in the sixth embodiment will be denoted by the same reference numerals and descriptions thereof will be omitted.

The sorting device 27 according to the embodiment can be used to sort the following powder particles 10 for a shaped metal object. The powder 1 that can be sorted by the sorting device 27 includes the powder particles 10 having a powder body 10a made of a ferromagnetic material such as iron, cobalt, or nickel.

In the eighth embodiment, the sorting unit 32 sorts the powder particle 10 based on the result of identification performed by the sensor unit 22. The sorting unit 32 attracts the powder particle 10 with the identification result of "there is a change in the identification portion 10b" by an electromagnet. The sorting unit 32 guides the powder particle 10 (debris 19) with the result of "there is a change in the identification portion 10b" to the first storage 24 by such magnetic attraction.

With this configuration, the attractive force of the electromagnet can be controlled by a current flowing through a coil of the electromagnet. Since control of the attractive force is relatively easy, the trajectory of the powder particle 10 can be easily adjusted by controlling the attractive force. Since the sorting device 27 according to the eighth embodiment includes the sorting unit 32 that sorts the powder particle 10 based on the identification result performed by the sensor unit 22, the same advantageous effects as the sorting device 20 according to the sixth embodiment can be obtained.

Ninth Embodiment

Figure 9:
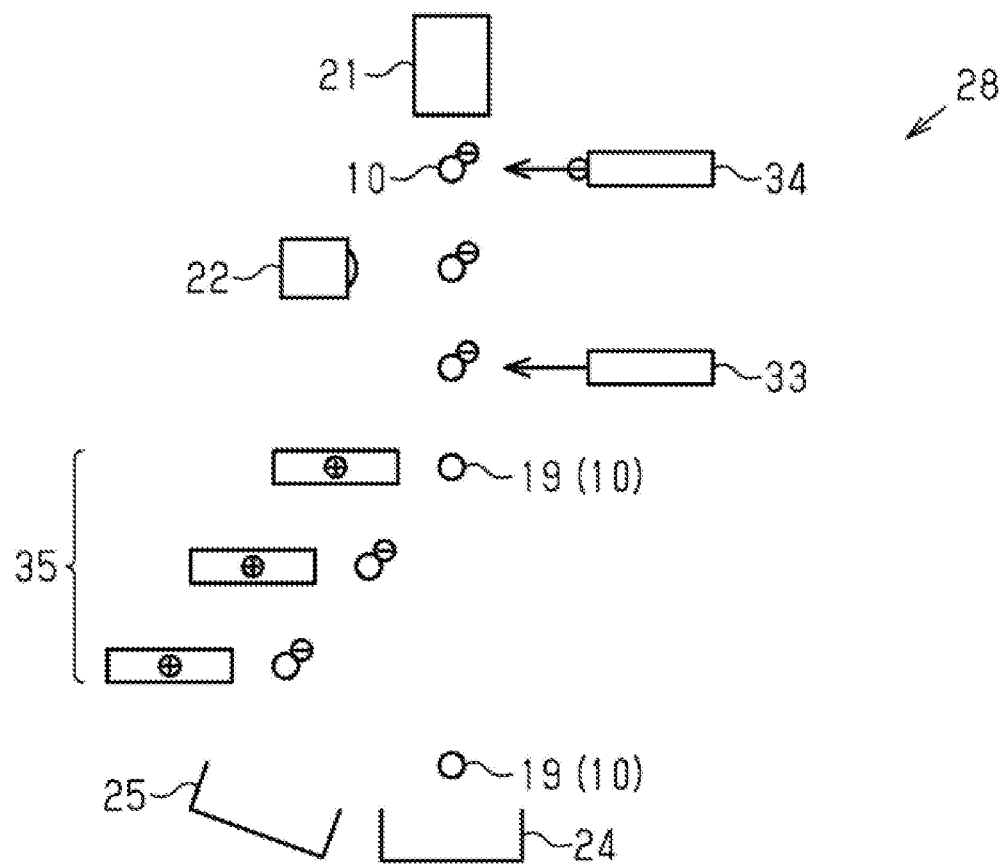
FIG. 9 is a schematic view of a sorting device for powder particles used for fabrication of a shaped metal object according to a ninth embodiment.

A sorting device 28 for the powder particles 10 for a shaped metal object will now be described with reference to FIG. 9.

In a ninth embodiment, the configuration of a sorting unit 33 is different from that of the sorting unit 23 in the sixth embodiment. In the ninth embodiment, the sorting device 28 for the powder particles 10 further includes an electrically charging unit 34 and a guide unit 35 that guides the powder particle 10. In the following description of the ninth embodiment, the same elements as in the sixth embodiment will be denoted by the same reference numerals and descriptions thereof will be omitted.

The discharge unit 21 drops the powder particles 10 of the powder 1 one by one. The charging unit 34 negatively charges the powder particle 10. The guide unit 35 is formed of a positively charged material, and attracts the negatively charged powder particle 10. The guide unit 35 guides the negatively charged powder particle 10 in a direction intersecting the vertical direction. The negatively charged powder particle 10 is guided by the guide unit 35 in the direction intersecting the vertical direction, and moves toward the second storage 25.

The sorting unit 33 sorts the powder particle 10 based on the result of identification performed by the sensor unit 22. The sorting unit 33 removes electric charge of the powder particle 10 with the identification result of "there is a change in the identification portion 10b". The sorting unit 33 causes the powder particle 10 (debris 19) of "there is a change in the identification portion 10b" to fall vertically toward the first storage 24 by removing the electric charge of the powder particle 10.

With this configuration, the attractive force can be controlled by the positive charge amount of the guide unit 35. Since control of the attractive force is relatively easy, the trajectory of the powder particle 10 can be easily adjusted by controlling the attractive force. Since the sorting device 28 according to the ninth embodiment includes the sorting unit 33 that sorts the powder particle 10 based on the identification result performed by the sensor unit 22, the same advantageous effects as the sorting device 20 according to the sixth embodiment can be obtained.

Tenth Embodiment

Figure 10:
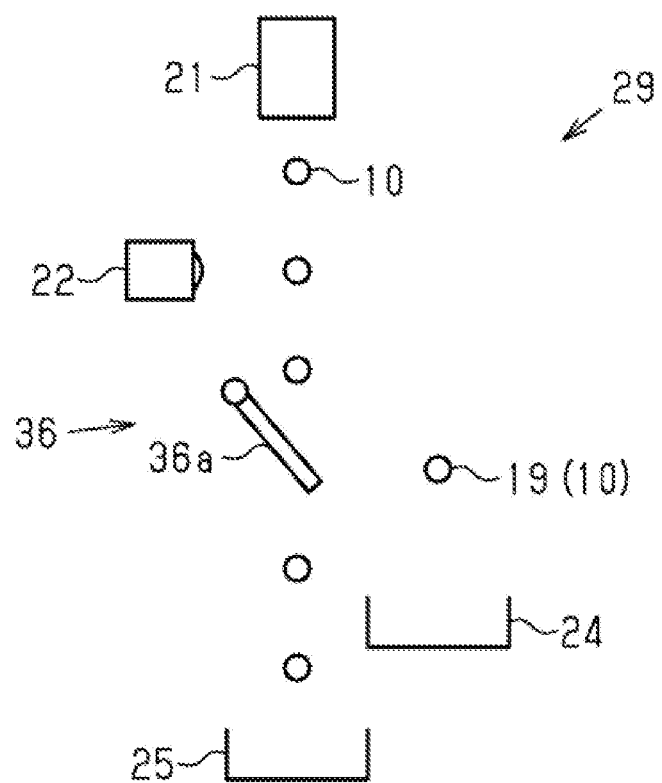
FIG. 10 is a schematic view of a sorting device for powder particles used for fabrication of a shaped metal object according to a tenth embodiment.

A sorting device 29 for the powder particles 10 for a shaped metal object will now be described with reference to FIG. 10.

In a tenth embodiment, the configuration of a sorting unit 36 is different from that of the sorting unit 23 in the sixth embodiment. In the following description of the tenth embodiment, the same elements as in the sixth embodiment will be denoted by the same reference numerals and descriptions thereof will be omitted.

In the tenth embodiment, the sorting unit 36 sorts the powder particle 10 based on the result of identification performed by the sensor unit 22. The sorting unit 36 guides the powder particle 10 with the identification result of "there is a change in the identification portion 10b" to the first storage 24 by using a plate-shaped guide 36a. Specifically, the guide 36a is placed at a first position that intersects with the trajectory of the powder particle 10 or a second position that does not intersect with the trajectory of the powder particle 10 by rotation of the guide 36a itself. The guide 36a is situated at the first position when the identification result shows that "there is a change in the identification portion 10b". When the guide 36a is placed at the first position, the powder particle 10 (debris 19) with "there is a change in the identification portion 10b" comes into contact with the guide 36a, rolls along the guide 36a, and is moved toward the first storage 24.

According to this configuration, the sorting unit 36 is configured by the rotatable guide 36a. In this way, the sorting unit 36 can be simply configured. Further, since the powder particle 10 (debris 19) determined as "there is a change in the identification portion 10b" comes into contact with the guide 36a, such powder particles 10 can be reliably removed from the powder 1. Since the sorting device 29 according to the tenth embodiment includes the sorting unit 36 that sorts the powder particle 10 based on the identification result performed by the sensor unit 22, the same advantageous effects as the sorting device 20 according to the sixth embodiment can be obtained.

Eleventh Embodiment

Figure 11:
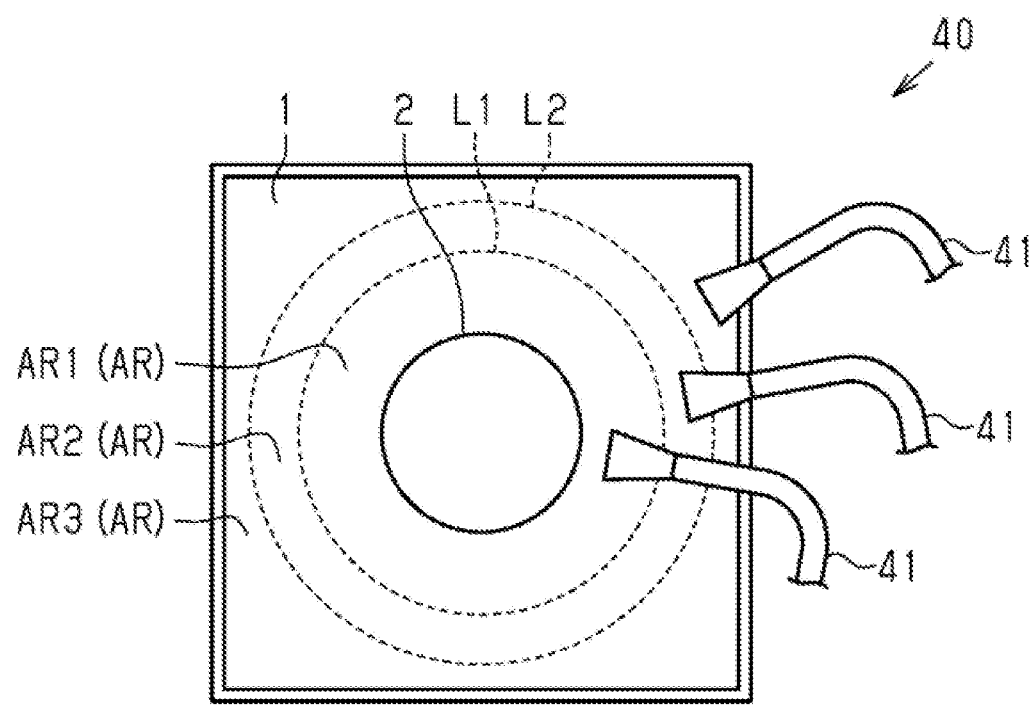
FIG. 11 is a schematic view of a sorting device for powder particles used for fabrication of a shaped metal object according to an eleventh embodiment.

A sorting device 40 for the powder particles 10 for a shaped metal object will now be described with reference to FIG. 11.

The sorting device 40 according to the eleventh embodiment sorts the powder particles 10 for a shaped metal object while the powder 1 remains around the shaped metal object 2 without taking out the powder 1 around the shaped metal object 2 after the shaped metal object 2 is formed.

The sorting device 40 includes a plurality of suction units 41. The suction unit 41 suctions the shaped metal object 2. The powder 1 around the shaped metal object 2 is divided into a plurality of areas AR when viewed from above. For example, a first area AR1 is the area inside a first demarcation line L1 that surrounds the shaped metal object 2. A second area AR2 is the area outside the first demarcation line L1 and inside a second demarcation line L2 surrounding the first demarcation line L1. A third area AR3 is the area outside the second demarcation line L2.

The first demarcation line L1 and the second demarcation line L2 are preferably set depending on the number of debris 19 per unit area. The number of debris 19 per unit area is calculated based on the identification results for the identification portions 10b performed by the sensor unit (for example, the sensor unit 22 of the sixth embodiment). The identification results can show a distribution of the powder particles 10 with the identification result of "there is a change in the identification portion 10b" (hereinafter, referred to as the changed powder particles 10). In this embodiment, the upper surface of the powder 1 around the shaped metal object 2 are divided into the three areas AR depending on the number of changed powder particles 10.

When the identification portion 10b is made of a colored polymer or an oxide film and has a color, the sensor unit measures a distribution of the powder particles 10 that have the original color of the identification portion 10b. When the identification portion 10b is configured as a groove, the sensor unit measures a distribution of the powder particles 10 that have the initial groove of the identification portion 10b. When the identification portion 10b is configured as a permanent magnet, the sensor unit measures a distribution of the powder particles 10 that have the initial strength of the magnetic field of the identification portion. When the identification portion 10b has an odor, the sensor unit measures a distribution of the powder particles 10 that have the initial odor intensity of the identification portion 10b.

The suction unit 41 is disposed in each of the areas AR divided by the first demarcation line L1 and the second demarcation line L2. The suction unit 41 suctions the powder 1 in the assigned area AR. The suction unit 41 may suction the powder 1 in the adjacent area AR beyond the first demarcation line L1 or the second demarcation line L2.

By using the plurality of suction portions 41 in this way, the powder 1 around the shaped metal object 2 can be sorted into three ranks depending on the number of changed powder particles 10 (the number per unit volume).

Twelfth Embodiment

Figure 12:
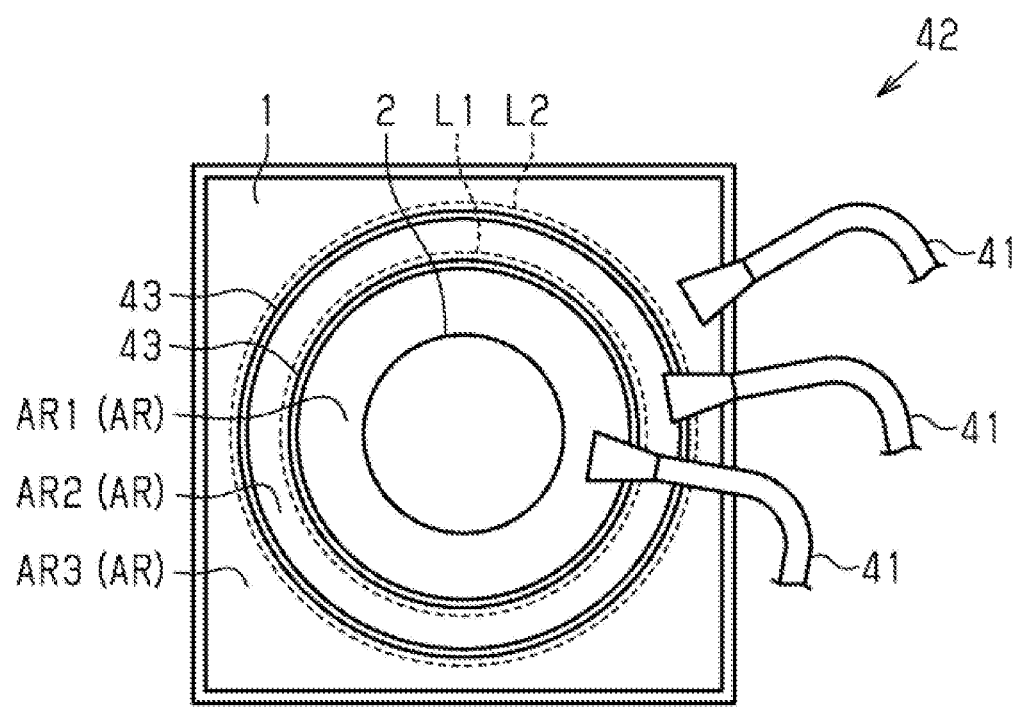
FIG. 12 is a schematic view of a sorting device for powder particles used for fabrication of a shaped metal object according to a twelfth embodiment.

A sorting device 42 for the powder particles 10 for a shaped metal object will now be described with reference to FIG. 12.

The twelfth embodiment is different from the eleventh embodiment in that the sorting device 42 for the powder particles 10 further includes a partition wall 43. In the following description of the twelfth embodiment, the same elements as in the eleventh embodiment will be denoted by the same reference numerals and descriptions thereof will be omitted.

The partition wall 43 of the sorting device 42 is arranged on the powder 1 around the shaped metal object 2 such that it separates the areas AR. The partition wall 43 is formed of, for example, a plastic sheet. The height of the partition wall 43 is not particularly limited. A part(s) of the partition wall 43 is buried in the powder 1. The partition wall 43 may be disposed such that a lower end of the partition wall 43 contacts a fabrication table 65a of a fabrication container 65 (see FIG. 17) that contains the powder 1, or a lower edge of the partition wall 43 does not contact the fabrication table 65a of the fabrication container 65 that contains the powder 1.

By partitioning each area AR by the partition wall 43 in this manner, when the suction unit 41 suctions the powder 1 in the assigned area AR, it is possible to prevent the suction unit 41 from suctioning the powder 1 in the adjacent areas AR beyond the demarcation line.

Thirteenth Embodiment

A method of sorting the powder particles 10 for a shaped metal object will now be described. The method for sorting the powder particles 10 includes an identifying step and a sorting step.

In the identifying step, the identification portion 10b provided on or in the powder body 10a of the powder particle 10 included in the powder 1 is identified. For example, the identification portion 10b is identified by using the sensor unit 22 described in the above embodiment.

In the sorting step, the powder particle 10 is sorted based on the result of identification performed in the identifying step. For example, the powder particle 10 can be sorted by the sorting unit 23, 31 to 33, or 36 described in the above embodiments. The sorting means is not limited to the configurations of the sorting units 23, 31 to 33, 36. For example, based on the identification result in the identification step, the powder particle 10 may be sorted manually or automatically by a robot.

Advantageous effects of the embodiment will now be described. The sorting method for the powder particles 10 includes the identifying step in which identification of the identification portion 10b provided on or in the powder body 10a of the powder particle 10 included in the powder 1 is performed, and the sorting step in which the powder particles 10 are sorted based on results of identification performed in the identifying step. According to this configuration, the powder particles 10 are sorted in the sorting step based on the identification results of the sensor unit 22 so that the powder particles 10 can be accurately sorted for reuse of the powder 1.

Fourteenth Embodiment

Figure 13:
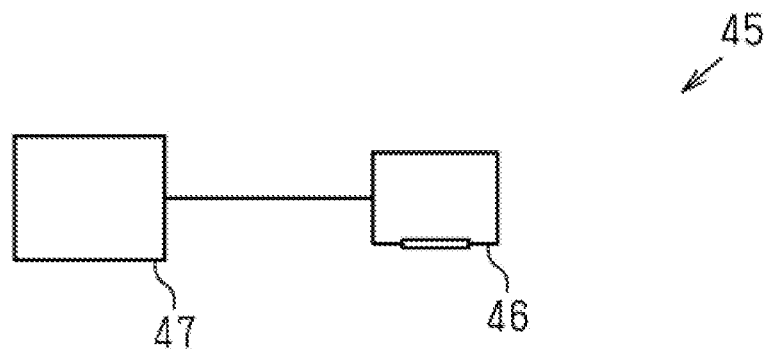
FIG. 13 is a schematic view of a purity determination device for powder particles used for fabrication of a shaped metal object according to a fourteenth embodiment.

A purity determination device 45 for the powder 1 will be described with reference to FIGS. 13 and 14.

The purity determination device 45 for the powder 1 determines the purity of the powder 1 including the powder particles 10 with the identification portions 10b. For example, the identification portion 10b of the powder particle 10 has a color. The colored identification portion 10b is made of a colored polymer or an oxide film. In another example, the identification portion 10b of the powder particle 10 is configured as a groove on the surface of the powder particle 10. In still another example, the identification portion 10b of the powder particle 10 is configured as a permanent magnet provided inside the powder particle 10. In still yet another example, the identification portion 10b has an odor.

The purity determination device 45 for the powder 1 includes a sensor unit 46 that identifies the identification portion 10b provided on or in the powder body 10a of the powder particle 10, and a purity determination unit 47 that determines the purity of the powder 1 based on results of identification performed by the sensor unit 46.

The sensor unit 46 detects the identification portion 10b. When the identification portion 10b has a color, the sensor unit 46 includes a color sensor. When the identification portion 10b includes a groove, the sensor unit 46 includes a camera. When the identification portion 10b includes a permanent magnet, the sensor unit 46 includes a magnetic sensor. When the identification portion 10b has an odor, the sensor unit 46 includes an odor sensor.

Figure 14:
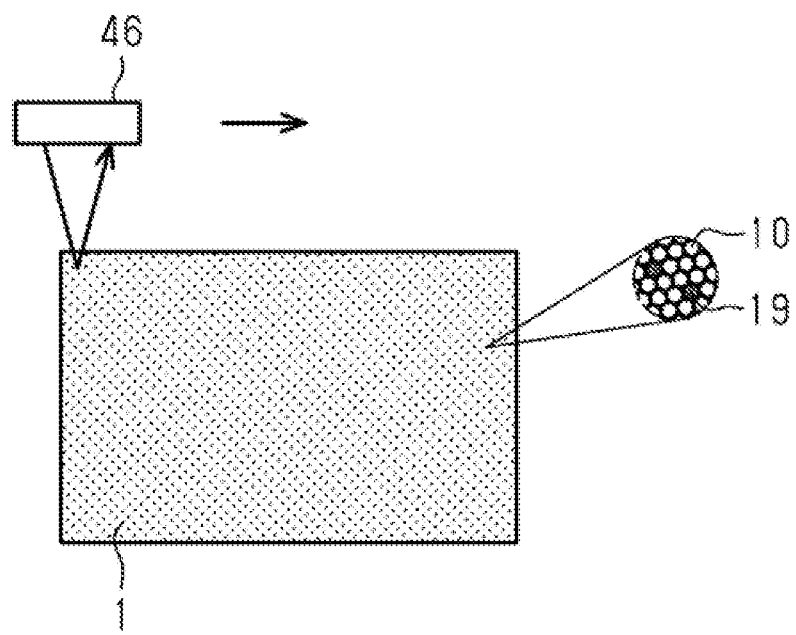
FIG. 14 is a view for explaining operation of the purity determination device according to the fourteenth embodiment.

As shown in FIG. 14, the sensor unit 46 is disposed at a position separated from the surface of the powder 1 by a predetermined distance, moves along the surface of the powder 1 in the vertical direction and the horizontal direction to identify the identification portions 10b of the powder 1.

An example in which the identification portion 10b has a color will be described. In this case, the sensor unit 46 detects the color and further calculates a color hue per unit area on the surface of the powder 1. The hue per unit area is calculated from colors of pixels included in the unit area. The hue per unit area changes depending on the amount of debris 19. The purity determination unit 47 determines the purity level of the powder 1 by detecting the hue.

An example in which the identification portion 10b includes a groove will be described. In this case, the sensor unit 46 detects, through image processing, the number of the powder particles 10 whose groove shape has changed. When a large amount of debris 19 is included in the powder, the number of powder particles 10 whose groove shape has changed increases. The purity determination unit 47 determines the level of purity of the powder 1 by detecting the number of the powder particles 10 whose groove shape has changed in a unit area.

An example in which the identification portion 10b includes a permanent magnet will be described. In this case, the sensor unit 46 detects the strength of the magnetic field per unit area on the surface of the powder 1. When a large amount of debris 19 is included, the strength of the magnetic field per unit area decreases. The purity determination unit 47 determines the purity level of the powder 1 by detecting the strength of the magnetic field.

An example in which the identification portion 10b releases an odorous substance will be described. In this case, the sensor unit 46 detects the intensity of the odor intensity per unit area on the surface of the powder 1. When a large amount of debris 19 is included, the odor intensity per unit area decreases. The purity determination unit 47 determines the purity level of the powder 1 by detecting the intensity of the odor.

Advantageous effects of the embodiment will now be described.

According to the above configuration, the purity determination unit 47 determines the purity of the powder 1 based on identification results of the sensor unit 46, so that the accuracy of the purity determination can be improved. Since the accuracy of the purity determination is high, the following can be implemented. When the purity of the powder 1 is high, the powder 1 may be reused without sorting the powder particles 10. When the purity of the powder 1 is low, sorting of the powder particles 10 may be repeatedly performed for a few or several times. As described above, since the purity of the powder 1 can be accurately determined, it is possible to optimize the sorting operation of the powder particles 10. Further, in fabrication of the shaped metal object 2, it is possible to know the amount of debris 19 generated, and the beam intensity can be optimized based on the amount of debris 19.

Fifteenth Embodiment

A method of determining the purity of the powder 1 will be described. The method of determining the purity of the powder 1 includes an identifying step and a purity determining step.

In the identifying step, an operator or device identifies the identification portion 10b provided on or in the powder body 10a of the powder particle 10 included in the powder 1. For example, a sensor unit identifies the identification portion 10b of the powder particle 10. In the purity determining step, an operator or the purity determining unit 47 (see FIG. 13) determines the purity of the powder 1 based on the identification result in the identifying step.

According to the above purity determination method, the purity of the powder 1 is determined in the purity determining step based on identification results obtained in the identifying step, so that the accuracy of the purity determination can be improved. As described above, since the purity of the powder 1 can be accurately determined, it is possible to optimize the sorting operation of the powder particles 10. Further, in fabrication of the shaped metal object 2, it is possible to know the amount of debris 19 generated, and the beam intensity can be optimized based on the amount of debris 19.

Sixteenth Embodiment

Figure 15:
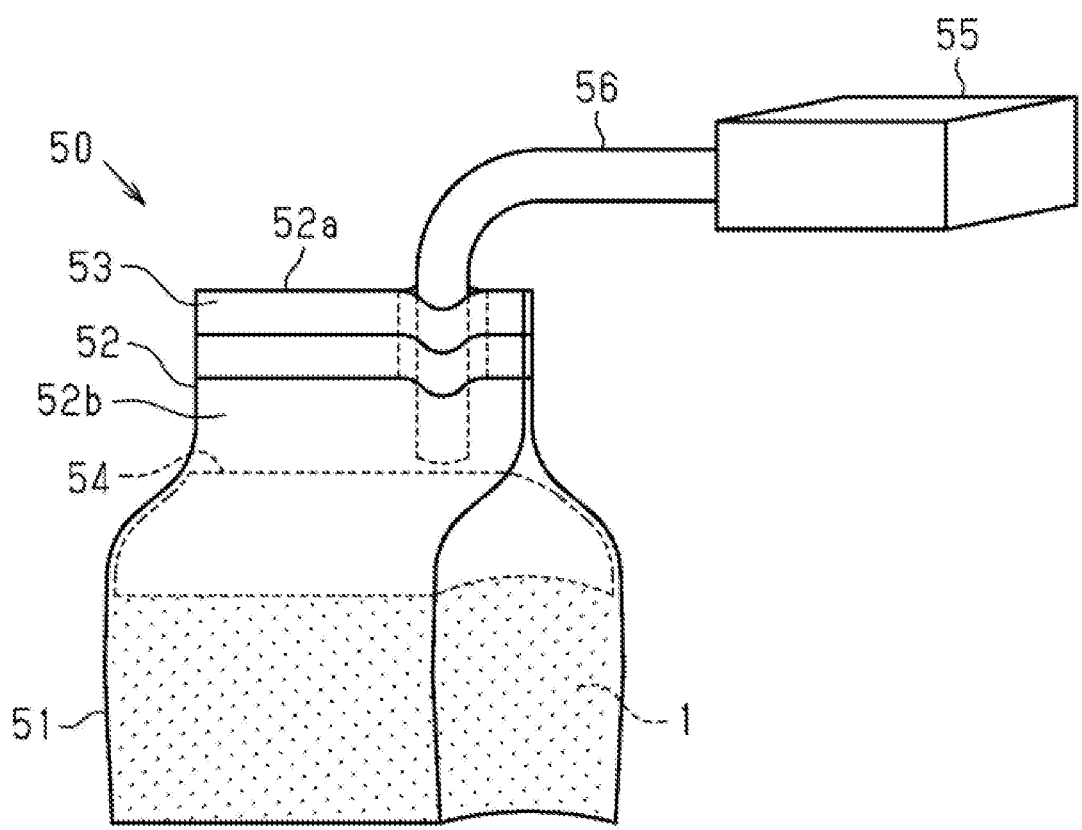
FIG. 15 is an explanatory diagram of a storage method according to a sixteenth embodiment.
Figure 16:
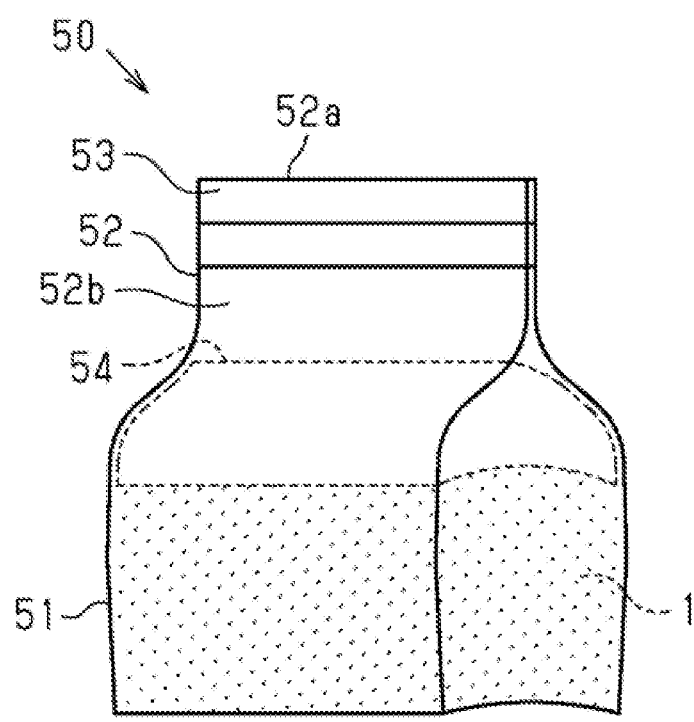
FIG. 16 is a schematic diagram of a storage container according to the sixteenth embodiment.

A method of storing the powder 1 and a storage container 50 will be described with reference to FIGS. 15 and 16.

The storage container 50 for the powder 1 maintains the powder 1 in a movement restricted state in which the powder particles 10 contained in the powder 1 is prevented from moving. In particular, the storage container 50 for the powder 1 is suitable for storing the powder 1 that includes the powder particles 10 having the identification portions 10b.

The storage container 50 for the powder 1 includes a bag 51 in which the powder 1 is retained, an opening 52 provided in the bag 51, and a seal portion 53 for closing an opening end 52a of the opening 52. The storage container 50 for the powder 1 preferably includes a filter 54 that prevents the powder 1 from being sucked by an air suction device 55. The size of a mesh of the filter 54 is preferably smaller than the average particle size of the powder particles 10. The bag 51 and the opening 52 are made of a resin sheet. The opening 52 includes a tubular extended portion 52b extending from the opening end 52a to the bag 51. The seal portion 53 is provided close to the opening end 52a.

A method of storing the powder 1 will be described.

In the method of storing the powder 1 according to the embodiment, the powder 1 is stored in the movement restricted state in which the powder particles 10 included in the powder 1 is prevented from moving.

Specifically, the powder 1 is placed into the bag 51 of the storage container 50 while the opening 52 is opened. The surface of the powder 1 is subsequently covered with the filter 54. A suction hose 56 of the air suction device 55 is inserted through the opening 52, and the opening end 52a is closed by the seal portion 53. In this state, the air inside the storage container 50 is suctioned. Then, a sheet forming the storage container 50 is attracted toward the inside of the storage container 50 by suction, and the powder particles 10 are pressed by the sheet so that the powder particles 10 closely contact to each other. When the powder particles 10 come into the close contact in this way, the suction hose 56 of the air suction device 55 is pulled out through the opening 52, the opening end 52a is completely closed by the seal portion 53, and the seal portion 53 is closed.

Advantageous effects of the embodiment will now be described.

The powder particles 10 move in the storage container 50 and the powder particles 10 rub against each other when the powder 1 is conveyed. So, there is a risk that the identification portions 10b of the powder particles 10 come off. In this respect, according to the above configuration, the movement of the powder particles 10 is suppressed so that friction between the powder particles 10 is reduced, and the identification portions 10b of the powder particles 10 are less likely to come off. This makes it possible to provide the powder 1 with less flaking of the identification portions 10b. Further, the storage container 50 for the powder 1 keeps the powder 1 including the powder particles 10 in the movement restricted state in which the movement of the powder particles 10 is prevented, so that it is possible to provide the powder 1 in which the identification portions 10b are less likely to flake.

Seventeenth Embodiment

A method of manufacturing the shaped metal object 2 will be described with reference to FIGS. 17 and 18.

In the method of manufacturing the shaped metal object 2, the shaped metal object 2 is formed by using the powder 1 that includes the powder particles 10 having the identification portions 10b. The shaped metal object 2 is formed by a conventional powder sintering additive manufacturing method. The method of manufacturing the shaped metal object 2 is characterized by a way to supplying the powder 1.

Batches of the powder 1 is managed according to the manufacturing date. By controlling batches of the powder 1 depending on the manufacturing date, the traceability of the quality of the shaped metal object 2 is improved.

Figure 17:
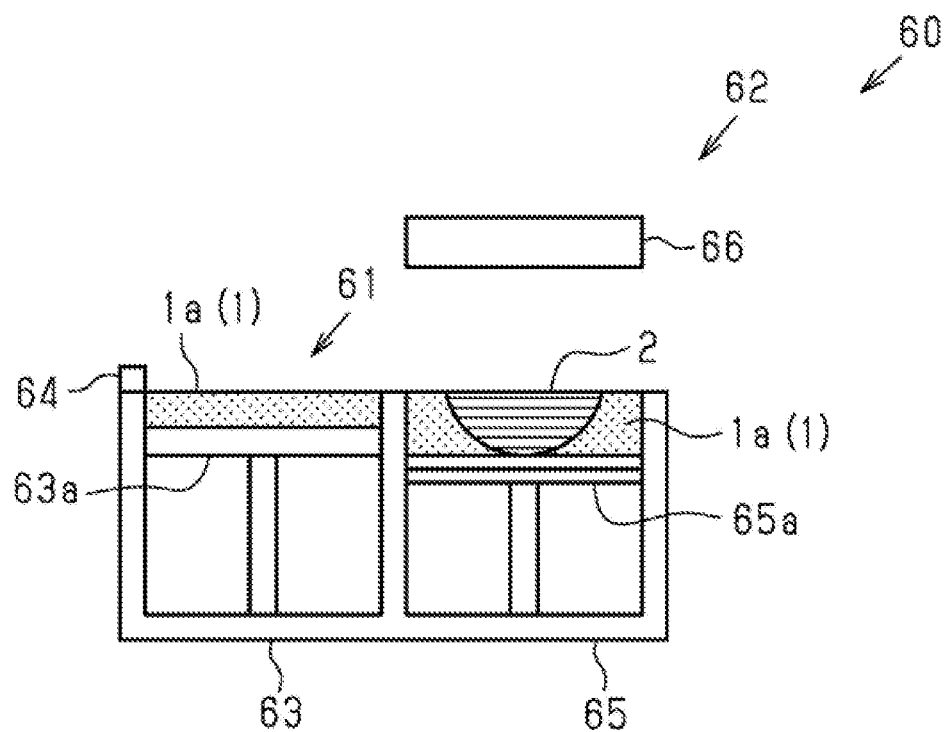
FIG. 17 illustrates positions of a fabrication table and a feedstock table of a manufacturing apparatus for a shaped metal object before batch switching according to a seventeenth embodiment.

There may be a case where a batch of the powder used for fabrication of the shaped metal object 2 runs out during the fabrication of the shaped metal object 2 (see FIG. 17). In this case, the powder 1 of another batch is used to continue the fabrication of the shaped metal object 2. As described above, when two or more batches of the powder 1 are used to fabricate the shaped metal object 2, it is difficult to determine the influence of the batches of the powder 1 on the quality of the shaped metal object 2. More specifically, when a quality issue occurs in the shaped metal object 2, it is difficult to determine which of the batches used earlier or later has a larger influence on the quality.

In the manufacturing method of the embodiment, in order to detect batches, the identification portions 10b of successively used two batches are made different from one another. That is, when one batch of the powder 1 is switched to another batch of the powder 1, the powder particles 10 of the powder 1 in a batch used after a previous batch of the powder 1 have identification portions 10b distinguishable from the identification portions 10b of the powder particles 10 in the previous batch of the powder 1. In this way, batches of the powder 1 used as the material for the shaped metal object 2 can be accurately managed.

Figure 18:
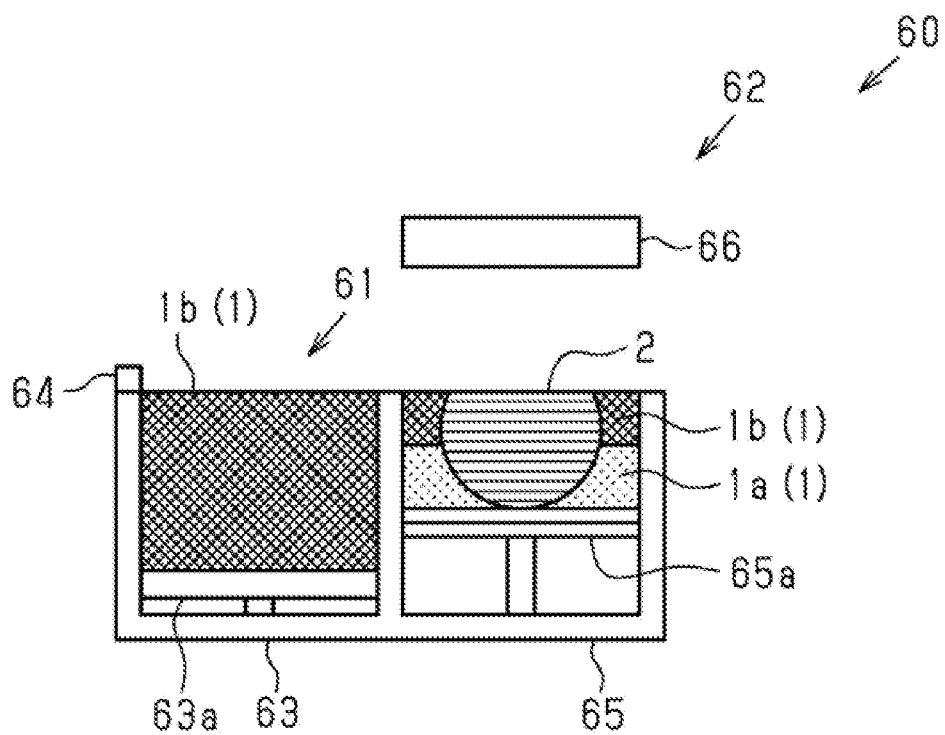
FIG. 18 illustrates positions of the fabrication table and the feedstock table of the manufacturing apparatus for a shaped metal object after the batch switching according to the seventeenth embodiment.

With reference to FIGS. 17 and 18, the manufacturing method according to the embodiment will now be described. In the manufacturing method of this embodiment, a manufacturing apparatus 60 for the shaped metal object 2 is used. The manufacturing apparatus 60 for the shaped metal object 2 includes a feed unit 61 that feeds the powder 1 including the powder particles 10 and a shaped metal object fabrication unit 62.

The feed unit 61 includes a feedstock container 63 that stores the powder 1 and a recoater 64 for feeding the powder 1 to the shaped metal object fabrication unit 62. At the bottom of the feedstock container 63, a feedstock table 63a that is movable vertically is disposed. To feed the powder 1, the feedstock table 63a is raised by the amount corresponding to one layer, and a prescribed amount of the powder 1 corresponding to the one layer is carried by the recoater 64 to the shaped metal object fabrication unit 62.

In the shaped metal object fabrication unit 62, the shaped metal object 2 is fabricated by sintering a prescribed portion of the powder 1 supplied from the feed unit 61 with a beam.

The shaped metal object fabrication unit 62 includes a fabrication container 65 and a beam output unit 66. At the bottom of the fabrication container 65, a fabrication table 65a that supports the shaped metal object 2 is disposed. The fabrication table 65a is vertically movable. When sintering of a layer of the powder 1 is completed by the beam irradiation, the fabrication table 65a is lowered by the amount corresponding to the layer.

When the powder 1 in the feedstock container 63 runs out, the feedstock container 63 is replenished with the powder 1 in the same batch. However, the powder 1 in the batch may have been used up. In such a case, the material container 63 is replenished with the powder 1 in another batch, which is a batch different from the previously used batch. Here, the feedstock container 63 is replenished with the powder 1 including the powder particles 10 that have the identification portions 10b distinguishable from the identification portions 10b of the powder particles 10 of the previous batch.

In a single same batch, the identification portions 10b have the same structure. In one example, two types of identification portions 10b are used to distinguish batches.

In the fabrication of the powder 1, on or in the powder bodies 10a of the powder particles 10, a first identification portion 10b and a second identification portion 10b that is a different type from the first identification portion 10b are alternately fabricated for batches of the powder 1 sequentially numbered. In this way, the structure of the identification portions 10b of the powder particles 10 included in the powder 1 is alternately changed in the batch number order. Such powder 1 is preferably used in the order of the batch number. In the fabrication of the metal shaped object 2, by using such powder 1 in the order of the batch number, it is possible to switch the type of the identification portion 10b every time the batch is replaced by a next new batch.

In the embodiment, after the fabrication of the shaped metal object 2 is completed, the powder 1 around the shaped metal object 2 is collected and the ratio of each type of powder 1 is measured. For example, in the fabrication of the shaped metal object 2, a first batch of a powder 1a including powder particles 10 with red identification portions 10b and a second batch of a powder 1b including powder particles 10 with blue identification portions 10b are used. In this case, by inspecting the individual powder particles 10 of the powder 1 around the shaped metal object 2 by a color sensor and identifying the color of the identification portion 10b of the metal powder particle 10, the ratio of the powder 1b in the second batch to the powder 1a in the first batch is calculated.

Eighteenth Embodiment

Figure 19:
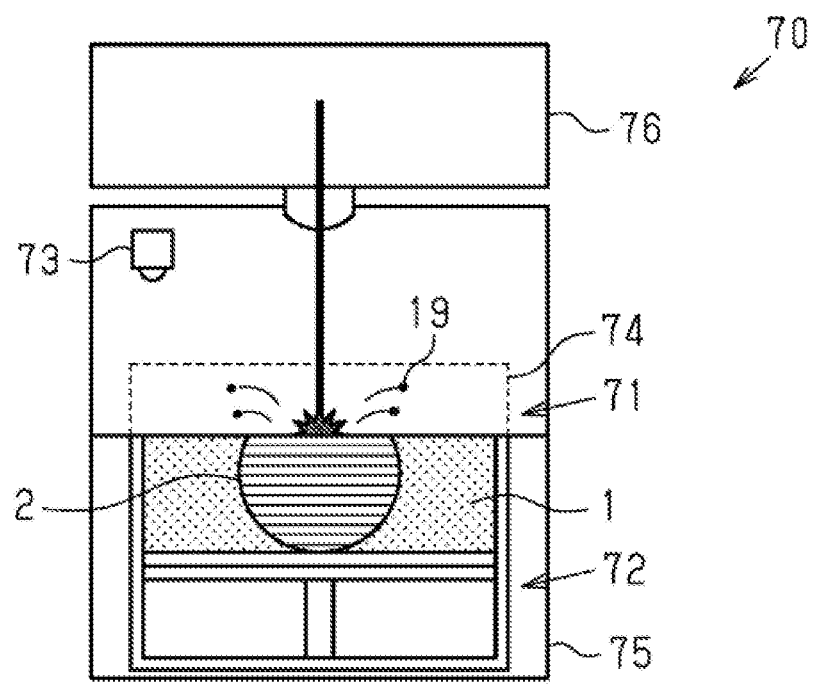
FIG. 19 is a schematic view of a manufacturing apparatus for a shaped metal object according to an eighteenth embodiment.

A manufacturing apparatus 70 for a shaped metal object 2 will now be described with reference to FIG. 19. The manufacturing apparatus 70 fabricates the shaped metal object 2 using the powder 1 that includes the powder particles 10 having the identification portions 10b. In the following description of the manufacturing apparatus 70 for the shaped metal object 2, the same configuration as the above-described manufacturing apparatus 60 for the shaped metal object 2 will be briefly described.

The manufacturing apparatus 70 for the shaped metal object 2 includes a feed unit 71, a shaped metal object fabrication unit 72, and a sensor unit 73.

The feed unit 71 feeds the powder 1 including the power particles 10 for a shaped metal object. The feed unit 71 includes a feedstock container (not shown) that stores the powder 1 and a recoater 74 for feeding the powder 1 to the shaped metal object fabrication unit 72.

In the shaped metal object fabrication unit 72, the shaped metal object 2 is fabricated by sintering a prescribed portion of the powder 1 supplied from the feed unit 71 with a beam. The shaped metal object fabrication unit 72 includes a fabrication container 75 and a beam output unit 76. The output unit 76 outputs a laser beam or an electron beam. The output unit 76 irradiates the powder 1 with a beam on a prescribed portion.

The sensor unit 73 detects the identification portions 10b of the powder particles 10 of the powder 1 in at least before, during or after the fabrication of the shaped metal object 2. The sensor unit 73 is configured similarly to the sensor unit 22 of the sixth embodiment.

Advantageous effects of the embodiment will now be described. In the above embodiment, the manufacturing apparatus 70 for the shaped metal object 2 includes the sensor unit 73 that detects the identification portions 10b of the powder particles 10 of the powder 1. With this configuration, when manufacturing the shaped metal object 2, it is possible to manage the level of impurities mixed in the powder 1 based on the information regarding the identification portions 10b detected by the sensor unit 73.

Nineteenth Embodiment

Figure 20:
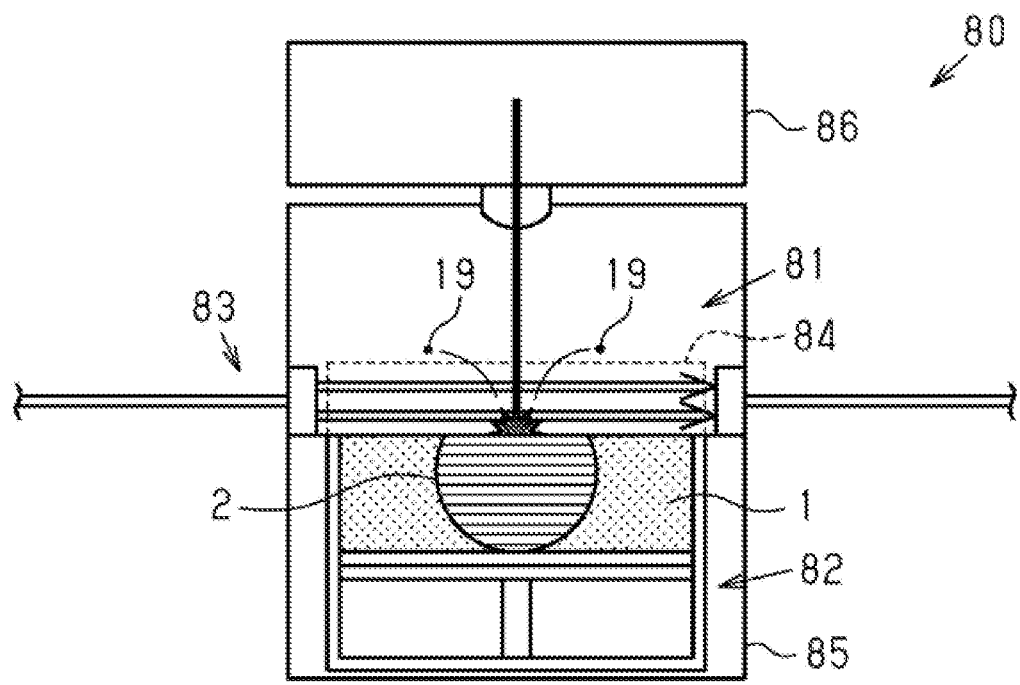
FIG. 20 is a schematic view of a manufacturing apparatus for a shaped metal object according to a nineteenth embodiment.

A manufacturing apparatus 80 for a shaped metal object 2 will now be described with reference to FIG. 20.

In the following description of the manufacturing apparatus 80 for the shaped metal object 2, the same configuration as the above-described manufacturing apparatus 60 for the shaped metal object 2 will be briefly described. The shaped metal object 2 is fabricated by the manufacturing apparatus 80 using the powder 1 that includes the powder particles 10 having an oxide film thereon as the identification portions 10b.

The manufacturing apparatus 80 for the shaped metal object 2 includes a feed unit 81, a shaped metal object fabrication unit 82, and a flow unit 83.

The feed unit 81 feeds the powder 1 including the power particles 10 for a shaped metal object. The feed unit 81 includes a feedstock container (not shown) that stores the powder 1 and a recoater 84 for feeding the powder 1 to the shaped metal object fabrication unit 82.

In the shaped metal object fabrication unit 82, the shaped metal object 2 is fabricated by sintering a prescribed portion of the powder 1 supplied from the feed unit 81 with a beam. The shaped metal object fabrication unit 82 includes a fabrication container 85 and a beam output unit 86. The output unit 86 outputs a laser beam or an electron beam. The output unit 86 irradiates the powder 1 with a beam on a prescribed portion.

A remover runs through the flow unit 83 to remove the identification portions 10b of the powder particles 10 included in the powder 1. Specifically, the remover is a reducing agent that removes the oxide film by reduction. An example of the reducing agent includes hydrogen. Hydrogen flows into the shaped metal object fabrication unit 82 together with an inert gas.

Advantageous effects of the embodiment will now be described. In this configuration, the identification portions 10b are removed by the remover during the fabrication process of the shaped metal object 2, and the powder particles 10 on which the identification portions 10b have been removed form the shaped metal object 2. As a result, it is possible to form the shaped metal object 2 that contains a relatively small amount of the identification portions 10b. More specifically, in the fabrication process of the shaped metal object 2, the oxide films serving as the identification portions 10b are removed by the reducing agent, and the powder particles 10 on which the oxide films have been removed form the shaped metal object 2. Consequently, it is possible to form the shaped metal object 2 that contains a relatively small amount of oxide.

Other Embodiments

The foregoing embodiments can be modified as described below. The above embodiment and the following modifications can be implemented in combination to the extent where they are technically consistent to each other.

The identification portion 10b is not limited to the examples given in the above embodiments. The identification portion 10b may be configured in any manner as long as it is detectable. In the embodiment, the color of the identification portion 10b may be identifiable by visible light, infrared light, or ultraviolet light. The identification portion 10b may be a color pattern (a predetermined pattern composed of a plurality of colors) or a geometric pattern (a striped pattern or a polka dot pattern).

Additionally or alternatively, the identification portion 10b may emit a predetermined light or radiation. For example, the identification portion 10b is formed of a polymer containing a fluorescent agent or a radioactive substance. Additionally or alternatively, the identification portion 10b may include a substance that absorbs a predetermined electromagnetic wave. For example, the identification portion 10b is made of a polymer containing a magnetic material.

The following numbered examples are embodiments.

1. A sorting method for powder particles for a shaped metal object, comprising:
   identifying an identification portion provided on or in a powder body of a powder particle; and
   sorting the powder particle based on a result of identification performed in the identifying.

2. A purity determination device for powder, comprising:
- a sensor unit identifying an identification portion provided on or in a powder body of a powder particle for a shaped metal object; and
- a purity determination unit determining a purity of the powder including the powder particle based on a result of identification performed by the sensor unit.

3. A method of determining a purity for powder, comprising:
- identifying an identification portion provided on or in a powder body of a powder particle for a shaped metal object; and
- determining a purity of the powder including the powder particle based on a result of identification performed in the identifying.

4. A method of manufacturing a shaped metal object, wherein when one batch of powder including a plurality of powder particles for a shaped metal object is switched to another batch of the powder, powder particles of the powder in a batch that is used after a previous batch have identification portions distinguishable from identification portions of powder particles of the powder in the previous batch.

5. A method of storing powder, wherein the powder including powder particles for a shaped metal object is stored in a movement restricted state where the powder particles are prevented from moving.

6. A storage container that keeps powder including powder particles for a shaped metal object in a movement restricted state where the powder particles are prevented from moving.

7. A manufacturing apparatus for a shaped metal object, comprising:
- a feed unit feeding a powder particle for a shaped metal object, the powder particle having a powder body made of metal and an identification portion provided on or in the powder body;
- a shaped metal object fabrication unit in which a shaped metal object is fabricated by sintering, with a beam, a prescribed portion of powder including the powder particle fed from the feed unit; and
- a sensor unit detecting the identification portion of the powder particle at least before, during or after fabrication of the shaped metal object.

8. A manufacturing apparatus for a shaped metal object, comprising:
- a feed unit feeding a powder particle for a shaped metal object, the powder particle having a powder body made of metal and an identification portion provided on the powder body;
- a shaped metal object fabrication unit in which a shaped metal object is fabricated by sintering, with a beam, a prescribed portion of powder including the powder particle fed from the feed unit; and
- a flow unit in which a remover flows to remove the identification portion of the powder particle.

9. The manufacturing apparatus for a shaped metal object according to example 8, wherein
- the identification portion of the powder particle is an oxide film formed by oxidation of a surface of the powder body of the powder particle, and
- the remover is a reducing agent.

What is claimed is:

1. A method of manufacturing powder particles used for fabrication of a shaped metal object, wherein when the sintering of the powder particles for the fabrication of the shaped metal object is completed, the shaped metal object is embedded in used powder particles that contain leftover powder particles, which were not used for the fabrication of the shaped metal object, and impurity, which is other than the leftover powder particles, the method comprising:
- fabricating powder bodies made of metal; and
- heating each of the powder bodies in an oxygen atmosphere to form an identification portion,
- wherein the identification portion is configured to be decreased or modified or evaporated as a result of being impinged by a radiation beam at a sintering temperature at which the powder particles are sintered such that at least a portion of the powder particles that are impinged by the radiation beam is peeled off forming the impurity, and the identification portion being configured to distinguish the leftover powder particles in the used powder particles from the impurity, whose identification portion is decreased or modified or evaporated, in the used powder particles to reuse the leftover powder particles by detecting the decrease or modification or evaporation,
- wherein the identification portion is made of an oxide of the metal.

* * * * *